United States Patent Office 2,816,091
Patented Dec. 10, 1957

2,816,091
POLYMERIC CHALCONES AND THEIR USE AS LIGHT-SENSITIVE POLYMERS

Albert C. Smith, Jr., Jack L. R. Williams, and Cornelius C. Unruh, Rochester, N. Y., assignors to Eastman Kodak Company, Rochester, N. Y., a corporation of New Jersey No Drawing. Application May 26, 1955, Serial No. 511,418

14 Claims. (Cl. 260—64)

This invention relates to resinous esters of maleic anhydride polymers with ω-hydroxyalkoxyacetophenones or with certain derivatives thereof (chalcones), and to a process for their preparation.

It is known that polymers containing the chalcone group ($-C_6H_4CH=CH-CO-C_6H_4-$) as a portion of their structure have the property of being insolubilized on exposure to ultraviolet light. Compounds of this character are valuable for the preparation of resist images, for example, for printing plates. However, in the preparation of many of these polymers, it has been found difficult to maintain solubility in common organic solvents, because the double bond generated in forming the chalcone group is susceptible to undesirable side reactions resulting in insolubilization of the polymer. It would be highly desirable to provide polymers wherein the chalcone group remains intact so that the light-sensitivity would be at a maximum and which polymers would have good solubility and give hard and tough coatings and resist images.

We have now found that such desirable polymers can be prepared by first preparing the monomeric compound containing the chalcone group and then attaching it to a suitable polymer by a relatively simple reaction which is free from undesirable side reactions. The chalcone structure must, therefore, contain a suitable functional group by which it can be readily attached to a polymer. We have found that such a grouping is an esterifiable hydroxyl group which can, thereby, be attached to a polymer containing acid anhydride or acyl chloride groups, for example, to a maleic anhydride polymer. In this manner, a wide variety of polymers containing the chalcone group, and which display the properties of being insolubilized on exposure to light, having good solubility and giving hard and tough resist images from light-exposed coatings thereof, can be prepared.

It is, accordingly, an object of our invention to provide a new class of resinous polymers. A further object is to provide compositions which are light-sensitive and particularly useful for photomechanical reproduction processes. Another object is to provide compositions containing sensitizers to improve or modify the light-sensitivity of the resinous polymers of the invention. Another object is to provide a process for preparing the new class of polymers and materials containing these polymers. Other objects will become apparent hereinafter.

The resinous polymers of our invention are characterized by containing a substantial proportion of the following recurring structural unit:

I. 

wherein $m$ represents 1 or 2, R represents preferably a styrene unit, but can also be a vinyl ester unit such as a vinyl acetate unit, a vinyl propionate unit, etc., an isopropenyl ester unit, an alkyl acrylate or methacrylate unit, a vinyl alkyl ether unit or an ethylene unit, $R_1$ represents an alkylene group containing from 2 to 3 carbon atoms such as $-CH_2CH_2-$ or $-CH_2CH_2CH_2-$ and $R_2$ represents hydrogen or a monovalent substituent such as a halogen atom such as chlorine or bromine, a methylene dioxy group, an alkyl group containing from 1 to 4 carbon atoms, e. g. methyl, ethyl, isopropyl, butyl, etc. groups, an alkoxy group containing from 1 to 4 carbon atoms, e. g. methoxy, ethoxy, propoxy, butoxy, etc. groups, an acetamino group, a $-COOR_3$ group wherein $R_3$ represents a hydrogen atom or an alkali metal atom, e. g. sodium or potassium, an $-SO_3R_3$ group wherein $R_3$ has the above definition and a

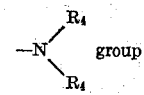

wherein $R_4$ represents an alkyl group containing from 1 to 4 carbon atoms.

The steps of the process for preparing the above defined resinous polymers are illustrated by the following reaction equations wherein, for example, an ω-hydroxyalkoxyacetophenone is reacted with a benzaldehyde to give a chalcone, followed by reaction of the chalcone with, for example, a styrene-maleic anhydride copolymer:

(II)
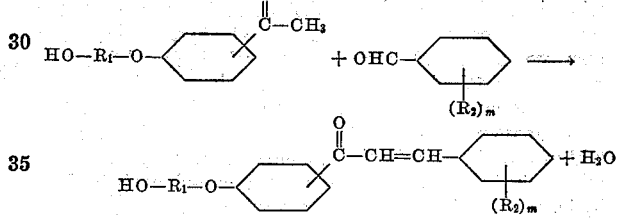

(III)
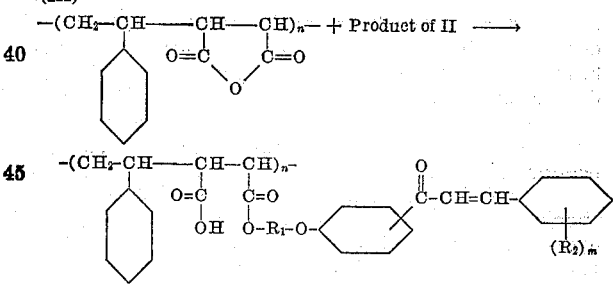

wherein $m$ is as previously defined and $n$ represents a whole number indicating that the group is a recurring unit. The monoester products represented by the product of Equation III are preferred. The proportions of the recurring structural unit represented in Equation III can vary in the polymer molecule from about 20% to about 99%, i. e. up to substantially 100%, by weight, the remainder of the molecule to make up 100% being composed of unreacted or hydrolyzed styrene-maleic anhydride units, e. g. styrene-maleic acid units. The styrene unit in above Equation III as previously indicated can be replaced by any one of the units represented by R. In the step represented by Equation II for preparing the intermediate chalcone, the condensation of the selected ω-hydroxyalkoxyacetophenone with the selected benzaldehyde can be carried out in approximately equimolar proportions, though an excess of one or the other of the reactants can also be employed, preferably in aqueous alcoholic solution containing up to about 1.25 mole equivalents of an alkali metal hydroxide such as sodium hydroxide, at a temperature of from about 20°–100° C. In the step represented by Equation III, the reaction of the chalcone with the maleic anhydride polymer is also carried out in about equimolar proportions, but it is also within the scope of the invention to vary the proportions over a relatively wide range, say from about 0.10–1.00 mole equivalents of the chalcone to each mole of the maleic anhydride polymer thereby obtaining corresponding variable amounts of the specified units in each polymer molecule. Preferably, the reaction is carried out at elevated temperatures in a liquid nitrogen base compound such as pyridine. The products of these reactions can be separated from their reaction mixtures by conventional methods such as crystallization, extraction, etc. of the non-polymeric products and precipitation, extraction, etc. of the polymeric products.

Suitable ω-hydroxyalkoxyacetophenones for practicing our invention include 4-(β-hydroxyethoxy)acetophenone, 3 - (β - hydroxyethoxy)acetophenone, 2 - (β - hydroxyethoxy)acetophenone, 4 - (γ - hydroxypropoxy)acetophenone, etc. and their various alkyl nuclear-substituted derivatives. Compounds of the above kind can most readily be prepared by reacting a hydroxyacetophenone with either ethylene oxide (or other alkylene oxides such as 1,2-propylene oxide, etc.) or with a haloalcohol, in the presence of sodium hydroxide.

Suitable preferred aldehydes for practicing our invention include benzaldehydes represented by the general formula:

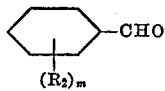

wherein $R_2$ is as previously defined and $m$ represents the number 1 or 2. Other aromatic aldehydes which can also be employed include furfuraldehyde, 2,3 or 4-pyridine aldehydes, thenaldehyde, cinnamaldehyde, 1-naphthaldehyde, 2-naphthaldehyde, 9-anthraldehyde, 1,8-naphthaldehydic acid, etc. Typical aldehydes coming within the above definition include benzaldehyde, monoalkyl substituted benzaldehydes such as o-chlorobenzaldehyde, p-bromobenzaldehyde, o-tolualdehyde, m-tolualdehyde, p-tolualdehyde and corresponding ethyl-, propyl- and butyl-benzaldehydes, monoalkoxy substituted benzaldehydes such as m-methoxybenzaldehyde, o-methoxybenzaldehyde, p-methoxybenzaldehyde, p-ethoxybenzaldehyde, etc., the mono- and di-hydroxy benzaldehydes, vanillin, isovanillin, piperonal, the carboxy-benzaldehydes such as o-aldehydo-benzoic acid, p-aldehydobenzoic acid, etc. and sodium and potassium salts thereof, the sulfo-benzaldehydes such as benzaldehyde-m-sulphonic acid, benzaldehyde-o-sulphonic acid, benzaldehyde-p-sulphonic acid, etc. and sodium and potassium salts thereof, acetamino benzaldehydes such as p-acetaminobenzaldehyde, etc., and N-alkyl substituted aminobenzaldehydes such as dimethyl- and p-diethyl-aminobenzaldehydes and the like.

Suitable maleic anhydride polymers that can be employed in our invention include various copolymers of maleic anhydride, preferably approximately 1:1 copolymers of styrene and maleic anhydride, but other approximately 1:1 copolymers of maleic anhydride are also operable such as, for example, vinyl acetate-maleic anhydride copolymers, isopropenyl acetate-maleic anhydride copolymers, alkyl acrylate or methacrylate copolymers wherein the alkyl group in each instance contains from 1 to 4 carbon atoms such as methyl acrylate-maleic anhydride, methyl methacrylate-maleic anhydride etc. copolymers, vinyl alkyl ether-maleic anhydride copolymers such as vinyl methyl ether-maleic anhydride, vinyl butyl ether-maleic anhydride etc. copolymers, ethylene-maleic anhydride copolymers, and the like. Furthermore, certain other homopolymers and copolymers may be substituted for the maleic anhydride copolymers such as, for example, homopolymers of acrylic and alkylacrylic anhydrides, the homopolymers and copolymers of acid chlorides such as polyacrylyl chloride, polymethacrylyl chloride and copolymers of fumaryl chloride, etc.

Most of the resinous polymeric products of our invention are soluble in one or more common organic solvents such as acetone, dioxane, methyl ethyl ketone, pyridine, methyl Cellosolve, ethyl Cellosolve, Cellosolve esters, chlorinated hydrocarbons, etc. Such solutions are useful for various purposes such as for sizing of fibrous materials, the polymer being converted to the insoluble form on exposure of the sized or impregnated material to actinic light. They are also useful for the coating of various surfaces, and are more especially useful because of their light-sensitivity, for forming resist images on printing plate supports such as on aluminum, zinc, copper and magnesium and various alloys thereof. When coatings of the polymers on such supports are light-exposed to a subject such as a line, half-tone or continuous tone image, the coatings are rendered insoluble in organic solvents in the area of exposure, and the unexposed area can then be readily removed with one or more of the above-mentioned solvents. Advantageously, sensitizing or modifying agents can be incorporated into the solution of polymer to improve light-sensitivity and, accordingly, reduce the required time of exposure. A suitable sensitizer, for example, is 2-benzoylmethylene-1-methyl-β-naphthothiazoline. The resulting relief image of insoluble polymer can then be used as a plate etching resist, or if prepared on a lithographic surface such as zinc, surface-hydrolyzed cellulose ester, casein, etc., the relief image can be inked and printed onto paper, etc. on a lithographic or other printing press.

The invention as illustrated further by the following examples of certain preferred embodiments thereof.

*Example 1.—4-(β-hydroxyethoxy) acetophenone*

(a) From p-hydroxyacetophenone and ethylene chlorohydrin.

To a solution of 68 g. (0.5 mol.) of p-hydroxyacetophenone in 200 cc. of water containing 20 g. (0.5 mol.) of sodium hydroxide, there were added 40 g. (0.5 mol.) of ethylene chlorohydrin. The solution was heated on a steam bath for 5 hours, during which time it separated into two layers. The mixture was made strongly alkaline with concentrated sodium hydroxide and then extracted successively with 100 cc. and a 200 cc. portion of ethyl acetate. The ethyl acetate extracts were combined, washed twice with 200 cc. portions of saturated aqueous sodium chloride solution, and then dried over anhydrous sodium sulfate. The dry material was aspirated (by water-pump vacuum) until most of the ethyl acetate was removed and a brown solid remained. This was recrystallized from ether giving 42 g. of snow-white crystals, M. P. 71°–72° C. Analysis of this product gave by weight 66.4% of carbon and 6.8% of hydrogen compared with calculated $C_{10}H_{12}O_3$ of 66.7% and 6.7%, respectively. Further 4-(β-hydroxyethoxy)acetophenone was obtained by evaporation of the mother liquor.

(b) From p-hydroxyacetophenone and ethylene oxide.

A mixture of 70.7 g. (0.53 mol.) of p-hydroxyacetophenone with 23.2 g. (0.53 mol.) of ethylene oxide was heated in a stainless steel bomb at 200° C. for 3.5 hours under 2500 p. s. i. of hydrogen. The solid which was removed from the cooled bomb melted at 61°–65° C. Recrystallization from a mixture of 350 cc. of acetone and 300 cc. of hexane, gave after treating with Norite (a decolorizing activated charcoal) 40 g. of 4-(β-hydroxyethoxy) acetophenone, M. P. 70.5°–71° C. Additional recrystallization from benzene gave this compound in highly purified condition, M. P. 73°–74° C. Analysis of this product gave by weight 66.8% of carbon and 6.8% of hydrogen compared with calculated for $C_{10}H_{12}O_3$ of 66.7% and 6.7%, respectively. The 2,4-dinitrophenylhydrazone derivative melted at 221.5°–222.5° C.

Analysis of the latter gave by weight 53.3% of carbon, 4.5% of hydrogen and 15.6% of nitrogen compared with calculated for $C_{20}H_{16}O_6N_4$ of 53.7%, 4.9% and 15.6%, respectively. This result indicates that a relatively pure 4-(β-hydroxyethoxy) acetophenone had been obtained by the described process.

*Examples 2–7.—Condensation products of 4-(β-hydroxyethoxy) acetophenone with aldehydes to give chalcones*

A number of aldehydes were reacted with 4-(β-hydroxyethoxy) acetophenone to give the substituted 4'-(β-hydroxyethoxy) chalcone intermediates. The general method of preparation was to add about 1.25 mole equivalents of sodium hydroxide (as a 3 normal aqueous solution) to an equimolar mixture of the selected aldehyde and the 4-(β-hydroxyethoxy)acetophenone dissolved in 1 to 3 volumes of ethyl alcohol. The amount of alcohol used depended upon the solubility of the components therein, it being desirable to maintain complete solution. In one instance, that of sodium 4-carboxymethoxybenzaldehyde (Example 7) a somewhat higher content had to be used to achieve solution. The mixture was maintained at about room temperatures. The reaction product usually began to crystallize out in a short time, and after several hours, but usually after 24 hours, the crystalline precipitate was filtered off, dried and recrystallized from a suitable solvent. The following table gives the characteristics of the individual preparations and the chalcone products obtained.

of hydrogen compared with calculated for $C_{20}H_{20}O_6$ of 72.4% and 5.8%, respectively. This result indicates that the polymeric product consisted essentially of the recurring structural unit:

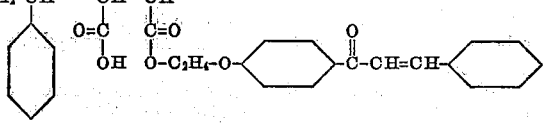

This polymer when coated from its solutions, exposed, and developed under the standard test conditions, showed a light-sensitivity speed of about 440.

*Example 9.—Reaction product of 4-methoxy-4'-(β-hydroxyethoxy) chalcone with styrene-maleic anhydride copolymer*

To a solution of 12.12 g. (0.06 mol.) of a dried approximately 1:1 copolymer of styrene and maleic anhydride in 150 cc. of hot, dry pyridine, there were added 20 g. (0.067 mol.) of 4-methoxy-4'-(β-hydroxyethoxy)chalcone. The clear, amber solution was then stirred and heated on a steam bath for 4 hours. The solution was then poured into approximately 2.5 liters of distilled water containing 400 cc. of acetic acid. A rubbery, yellow precipitate was produced. This was washed in fresh water which gave some hardening effect, and then leached in dilute aqueous acetic acid. The material was again washed in water, filtered from the wash water, and then dissolved

TABLE.—CHALCONE CRYSTAL PRODUCTS

| Example No. | Aldehyde | Product | Yield, percent | Recrystalizing Medium | Color | M. P., °C. | Analysis, Percent by Weight | |
|---|---|---|---|---|---|---|---|---|
| | | | | | | | Found | Calculated |
| 2 | Benzaldehyde | 4'(β-Hydroxy) Chalcone | 43 | Ether | White | 69–70 | C, 76.2 H, 6.0 | 76.1 6.0 |
| 3 | 4-Methoxybenzaldehyde | 4-Methoxy-4'(β-Hydroxyethoxy) Chalcone | 58 | Ethanol | Yellow | 106–8 | C, 72.1 H, 6.0 $OCH^3$, 12.2 | 72.5 6.0 10.4 |
| 4 | 3,4-Methylenedioxybenzaldehyde | 3,4-Methylenedioxy-4'(β-Hydroxyethoxy) Chalcone | 59 | Ethanol | Orange | 140.5–142 | C, 69.3 H, 5.3 | 69.2 5.1 |
| 5 | 4-Carboxymethoxybenzaldehyde | 4-Carboxymethoxy-4'(β-Hydroxyethoxy) Chalcone | 63 | Water | Yellow | 172–6 | C, 66.1 H, 5.1 COOH, 3.5 | 66.7 5.3 2.9 |
| 6 | 4-Dimethylaminobenzaldehyde | 4-Dimethylamino-4'(β-Hydroxyethoxy) Chalcone | 66 | Benzene | Red | 127–131 | C, 74.2 H, 7.0 N, 4.3 | 73.4 6.8 4.5 |
| 7 | 2-Sodiumsulfobenzaldehyde | 2-Sodiumsulfo-4'(β-Hydroxyethoxy) Chalcone | 47 | Water-Alcohol | White | | C, 55.1 H, 4.4 | 55.1 4.1 |

*Example 8.—Reaction product of 4'-(β-hydroxyethoxy) chalcone and styrene-maleic anhydride copolymer*

To a solution of 5.05 g. (0.025 mol.) of dried styrene-maleic anhydride copolymer in 75 cc. of hot, dry pyridine, there were added 7.4 g. (0.0275 mol.) of 4'-(β-hydroxyethoxy)chalcone. The mixture was stirred and heated on a steam bath for 5 hours, then poured into agitated dilute aqueous acetic acid. The gummy, white polymer which precipitated was leached briefly in distilled water and then in dilute aqueous acetic acid. It was then washed with fresh water, reprecipitated from 2-butanone and washed twice more with distilled water, then air dried. A yield of 8.4 g. of polymer was obtained. Analysis of this product gave by weight 74.0% of carbon and 5.6% in 250 cc. of 2-butanone. A two-layer system was formed and the bottom layer (water) was discarded. The remaining layer was poured into agitated, distilled water. The polymer thus formed was washed with fresh water and air dried. A yield of 25.3 g. of polymer was obtained. Analysis of this polymer product gave by weight 72.0% of carbon, 5.6% of hydrogen and 6.2% of methoxyl group compared with calculated for $C_{30}H_{28}O_7$ of 70.9%, 6.0% and 7.8%, respectively. This result indicates that the polymeric product consisted essentially of the recurring structural unit:

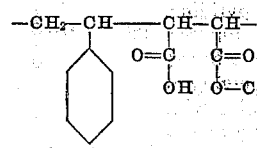

The light-sensitivity of a coating prepared from the polymer was high. An ink-carrying resist image was prepared on a surface-hydrolyzed cellulose acetate sheet by development of the exposed coating in moist 2-butanone.

*Examples 10–13.—Partial esterification of a styrene-maleic anhydride copolymer with 4-methoxy-4'-(β-hydroxyethoxy) chalcone*

Using the procedure described in above Example 9, three separate preparations were carried out using less than molar equivalents of the 4-methoxy-4'-(β-hydroxyethoxy)chalcone with the styrene-maleic anhydride copolymer.

(a) 0.25 mole equivalents of the chalcone gave a product containing approximately 43% by weight of the ester units, the remainder of the polymer molecule being styrene-maleic acid units. On coating, this polymeric product showed a light-sensitivity speed of 300 under the same testing conditions as used in Example 9.

(b) 0.50 mole equivalents of the chalcone gave a product containing approximately 69% by weight of ester units, the remainder of the polymer molecule being styrene-maleic acid units. On coating, this polymeric product showed a light-sensitivity of 1200 under the same testing conditions as (a).

(c) 0.75 mole equivalents of the chalcone gave a product containing approximately 88% by weight of ester units, the remainder of the polymer molecule being styrene-maleic acid units. On coating, this polymeric product showed a light-sensitivity of 1200 under the same testing conditions as (a).

(d) 0.10 mole equivalents of the chalcone gave a product containing approximately 20% by weight of the ester units, the remainder of the polymer molecule being styrene-maleic acid units. On coating, this polymeric product also showed a light-sensitivity speed sufficiently high to give good, usable resist images.

*Example 14.—Reaction product of 3,4-methylenedioxy-4'-(β-hydroxyethoxy)chalcone with styrene-maleic anhydride copolymer*

To a solution of 5.05 g. (0.025 mol.) of a dried approximately 1:1 copolymer of styrene and maleic anhydride in 75 cc. of hot, dry pyridine, there were added 8.6 g. (0.0275 mol.) of 3,4-methylenedioxy-4'-(β-hydroxyethoxy)chalcone. The mixture was stirred and heated on a steam bath. After 5 hours, the polymer was isolated by pouring the solution into dilute aqueous acetic acid. The slightly gummy polymer obtained was washed briefly in distilled water, leached in dilute aqueous acetic acid, washed again in water, isolated by filtration and dissolved in 200 cc. of 2-butanone. The polymer was isolated by precipitation in water, washed in fresh water and air dried. A yield of 10.5 g. of the polymer product was obtained. Analysis of this polymer product gave by weight 70.0% of carbon and 5.1% of hydrogen compared with calculated for $C_{30}H_{27}O_8$ of 68.9% and 5.3%, respectively. When coated and exposed under test conditions, this polymer product showed a speed of 700.

*Example 15.—Reaction product of 4-carboxymethoxy-4'-(β-hydroxyethoxy)chalcone with styrene-maleic anhydride copolymer*

To a solution of 10 g. (0.495 mol.) of a dried approximately 1:1 styrene-maleic anhydride copolymer in 100 cc. of hot, dry pyridine, there were added 20 g. (0.0585 mol.) of 4-carboxymethoxy-4'-(β-hydroxyethoxy)chalcone in solution in 50 cc. of warm, dry pyridine. The addition took place over a period of 50 minutes. After 3 hours of stirring on a steam bath, the solution was poured into dilute aqueous acetic acid, giving a yellow fibrous precipitate. This was washed twice with distilled water and air dried. The dry product was soluble in moist 2-butanone. The yield was approximately 14 g. Analysis of the product gave by weight 68.5% of carbon and 5.2% of hydrogen compared with calculated for $C_{31}H_{28}O_9$ of 68.5% and 6.0%, respectively. This polymer product was soluble in dilute ammonium hydroxide. Accordingly, dilute ammonium hydroxide could be used as the developing agent for an exposed coating of the polymer. It was also soluble in 2-butanone containing some water. The light-sensitivity of this polymer was relatively high, it having a sensitometric speed of about 1000.

*Example 16.—Reaction product of 4-dimethylamino-4'-(β-hydroxyethoxy)chalcone with styrene-maleic anhydride copolymer*

To a solution of 5.5 g. of an approximately 1:1 copolymer of styrene and maleic anhydride in 75 cc. of dry pyridine, there were added with stirring 8.5 g. of 4-dimethylamino-4'-(β-hydroxyethoxy)chalcone. The solution was heated and stirred on a steam bath for 5 hours, then poured into an agitated solution of 100 cc. of glacial acetic acid in 2 liters of distilled water. The precipitate which formed was redissolved in 2-butanone and reprecipitated in distilled water and then dried, yielding 10.7 g. of an orange colored polymer. It had a sensitometric speed of 25.

Although the above examples specify the use of chalcones containing the functional ω-hydroxyalkoxy group, it also is within the scope of the invention to employ related hydroxylated chalcones such as those wherein the hydroxylic function is present as a hydroxyalkyl group, for example, as in 4'-(α-hydroxyethyl)chalcone, which can be prepared in the general manner by the interaction of benzaldehyde with 1-(p-acetophenyl) ethanol. The latter compound can be prepared as described in the following example.

*Example 17.—1-(p-acetophenyl)ethanol*

A solution of 1 g. of sodium methoxide in 100 g. (0.49 mol.) of 1-(p-acetophenyl) ethyl acetate and 250 cc. of methanol was allowed to stand at room temperature for 30 minutes, after which time the solution was acidified with 5% hydrogen chloride in methanol. The excess of hydrogen chloride was removed, and 61 g. (76.8% of theory) of 1-(p-acetophenyl) ethanol, B. P. 118°–120° C./0.4 mm., refractive index at 25° C. of 1.5462, was obtained. Analysis of this compound gave by weight 73.1% of carbon and 7.4% of hydrogen compared with calculated for $C_{10}H_{12}O_2$ of 72.7% and 7.7%, respectively.

By proceeding in accordance with the above examples, other generally similar derived polymers having light-sensitive properties can be prepared. For example, mixtures of one or more of the hydroxylated chalcones can be readily substituted for any of the chalcones of the examples. Furthermore, mixtures of hydroxylated chalcones and other hydroxylated compounds of specific, desirable characteristics may be used. For instance, a monohydroxy dye or coupler compound can be used concomitantly with the hydroxylated chalcone. In any one molecule of this type used, it is necessary that only a single hydroxyl group be present and that amino groups containing a replaceable hydrogen be absent, otherwise insolubilization of the polymeric product would result.

We claim:

1. A resinous polymer consisting of from about 20% to substantially 100% by weight of the recurring structural unit:

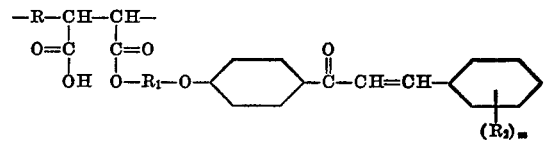

wherein $m$ represents a whole number from 1 to 2, R represents a member selected from the group consisting of a styrene structural unit, a vinyl acetate structural unit, an isopropenyl acetate structural unit, an alkyl acrylate structural unit wherein the alkyl group contains from 1 to 4 carbon atoms, an alkyl methacrylate structural unit wherein the alkyl group contains from 1 to 4 carbon atoms, a vinyl alkyl ether structural unit wherein the alkyl group contains from 1 to 4 carbon atoms and

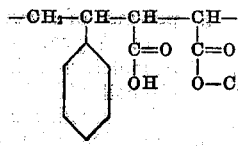

an ethylene structural unit, $R_1$ represents an alkylene group containing from 2 to 3 carbon atoms and $R_2$ represents a member selected from the group consisting of an atom of hydrogen, a halogen atom, a methylenedioxy group, an alkyl group containing from 1 to 4 carbon atoms, an alkoxy group containing from 1 to 4 carbon atoms, an acetamino group, a —$COOR_3$ group wherein $R_3$ represents a member selected from the group consisting of an atom of hydrogen and an alkali metal atom, an —$SO_3R_3$ group wherein $R_3$ has the above definition and an

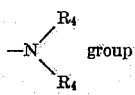

wherein $R_4$ represents an alkyl group containing from 1 to 4 carbon atoms, the remainder of the molecule to make a total of 100% being composed of the recurring structural unit:

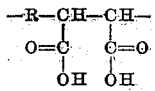

wherein R has the above definition.

2. A resinous polymer consisting of from about 20% to substantially 100% by weight of the recurring structural unit:

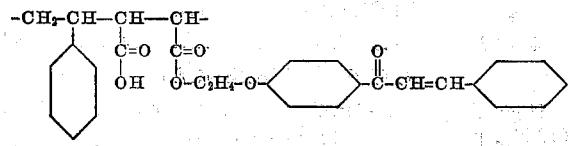

the remainder of the molecule to make a total of 100% being recurring hydrolyzed 1:1 styrene/maleic anhydride copolymer units.

3. A resinous polymer consisting of from about 20% to substantially 100% by weight of the recurring structural unit:

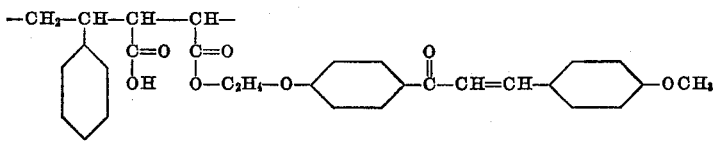

the remainder of the molecule to make a total of 100% being recurring hydrolyzed 1:1 styrene/maleic anhydride copolymer units.

4. A resinous polymer consisting of from about 20% to substantially 100% by weight of the recurring structural unit:

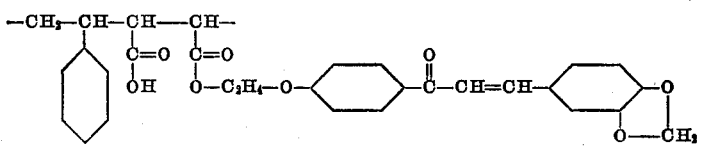

the remainder of the molecule to make a total of 100% being recurring hydrolyzed 1:1 styrene/maleic anhydride copolymer units.

5. A resinous polymer consisting of from about 20% to substantially 100% by weight of the recurring structural unit:

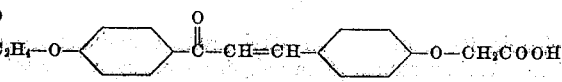

the remainder of the molecule to make a total of 100% being recurring hydrolyzed 1:1 styrene/maleic anhydride copolymer units.

6. A resinous polymer consisting of from about 20% to substantially 100% by weight of the recurring structural unit:

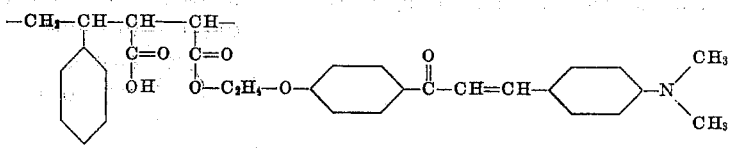

the remainder of the molecule to make a total of 100% being recurring hydrolyzed 1:1 styrene/maleic anhydride copolymer units.

7. A process for preparing an esterified copolymer of maleic anhydride containing from about 20% to substantially 100% by weight of combined ester groups which comprises reacting a maleic anhydride copolymer represented by the following recurring structural unit:

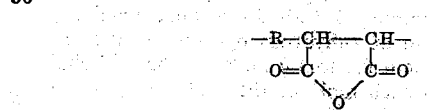

with a chalcone compound represented by the following structural formula:

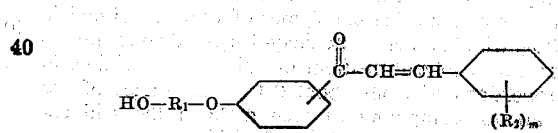

wherein $m$ represents a whole number of from 1 to 2, R represents a member selected from the group consisting of a styrene structural unit, a vinyl acetate structural unit, an isopropenyl acetate structural unit, an alkyl acrylate structural unit wherein the alkyl group contains from 1 to 4 carbon atoms, an alkyl methacrylate structural unit wherein the alkyl group contains from 1 to 4 carbon atoms, a vinyl alkyl ether structural unit wherein the alkyl group contains from 1 to 4 carbon atoms and an ethylene structural unit, $R_1$ represents an alkylene group containing from 2 to 3 carbon atoms and $R_2$ represents a member selected from the group consisting of an atom of hydrogen, a halogen atom, a methylenedioxy group, an alkyl group containing from 1 to 4 carbon atoms, an alkoxy group containing from 1 to 4 carbon atoms, an acetamino group, a —$COOR_3$ group wherein $R_3$ represents a member selected from the group consisting of an atom of hydrogen and an alkali metal atom, an —$SO_3R_3$ group wherein $R_3$ has the above definition and an

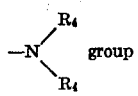

wherein $R_4$ represents an alkyl group containing from 1 to 4 carbon atoms, in an anhydrous nitrogen base solvent medium, in the proportions of from about 0.1 to 1.0 mole of the said chalcone compound to each mole of the said maleic anhydride copolymer.

8. A process for preparing an esterified copolymer of maleic anhydride containing from about 20% to substantially 100% by weight of combined ester groups which comprises reacting a 1:1 copolymer of styrene and maleic anhydride with 4'-($\beta$-hydroxyethoxy)chalcone, in a solvent medium of anhydrous pyridine, in the proportions of from about 0.1 to 1.0 moles of the said chalcone compound to each mole of the said copolymer of styrene and maleic anhydride.

9. A process for preparing an esterified copolymer of maleic anhydride containing from about 20% to substantially 100% by weight of combined ester groups which comprises reacting a 1:1 copolymer of styrene and maleic anhydride with 4-methoxy-4'-($\beta$-hydroxyethoxy)chalcone, in a solvent medium of anhydrous pyridine, in the proportions of from about 0.1 to 1.0 moles of the said chalcone compound to each mole of the said copolymer of styrene and maleic anhydride.

10. A process for preparing an esterified copolymer of maleic anhydride containing from about 20% to substantially 100% by weight of combined ester groups which comprises reacting a 1:1 copolymer of styrene and maleic anhydride with 3,4-methylenedioxy-4'-($\beta$-hydroxyethoxy)-chalcone, in a solvent medium of anhydrous pyridine, in the proportions of from about 0.1 to 1.0 moles of the said chalcone compound to each mole of the said copolymer of styrene and maleic anhydride.

11. A process for preparing an esterified copolymer of maleic anhydride containing from about 20% to substantially 100% by weight of combined ester groups which comprises reacting a 1:1 copolymer of styrene and maleic anhydride with 4-carboxymethoxy-4'-($\beta$-hydroxyethoxy)-chalcone, in a solvent medium of anhydrous pyridine, in the proportions of from about 0.1 to 1.0 moles of the said chalcone compound to each mole of the said copolymer of styrene and maleic anhydride.

12. A process for preparing an esterified copolymer of maleic anhydride containing from about 20% to substantially 100% by weight of ester groups which comprises reacting a 1:1 copolymer of styrene and maleic anhydride with 4-dimethylamino-4'-($\beta$-hydroxyethoxy)-chalcone, in a solvent medium of anhydrous pyridine, in the proportions of from about 0.1 to 1.0 moles of the said chalcone compound to each mole of the said copolymer of styrene and maleic anhydride.

13. A resinous polymer consisting of from about 40% to 100% by weight of the recurring structural unit

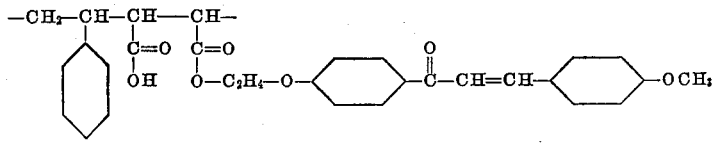

the remainder of the molecule to make a total of 100% being recurring hydrolyzed 1:1 styrene/maleic anhydride copolymer units.

14. A process for preparing an esterified copolymer of maleic anhydride containing from about 40% to 100% by weight of combined ester groups which comprises reacting a 1:1 copolymer of styrene and maleic anhydride with 4-methoxy-4'-($\beta$-hydroxyethoxy)chalcone, in a solvent medium of anhydrous pyridine, in the proportions of from about 0.25 to 1.0 mole of the said chalcone compound to each mole of the said copolymer of styrene and maleic anhydride.

References Cited in the file of this patent

UNITED STATES PATENTS

| 2,554,959 | Rowland | May 23, 1951 |
| 2,706,725 | Unruh et al. | Apr. 19, 1955 |
| 2,716,102 | Unruh et al. | Aug. 23, 1955 |
| 2,728,745 | Smith et al. | Dec. 27, 1955 |

FOREIGN PATENTS

| 479,838 | Great Britain | Feb. 11, 1938 |

OTHER REFERENCES

High Polymers, Carothers, vol. 1, Interscience Pub. (1940), page 84. (Copy in Div. 50.)